United States Patent
Koonankeil et al.

(10) Patent No.: US 9,561,555 B2
(45) Date of Patent: Feb. 7, 2017

(54) NON-LINE OF SIGHT ELECTRO DISCHARGE MACHINED PART

(71) Applicant: United Technologies Corporation, Hartford, CT (US)

(72) Inventors: James M. Koonankeil, Marlborough, CT (US); Edward F. Pietraszkiewicz, Southington, CT (US); Karl A. Schachtner, Marlborough, CT (US); Kevin J. Klinefelter, Uncasville, CT (US); Markus W. Fritch, Manchester, CT (US); Jason Daley, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 955 days.

(21) Appl. No.: 13/729,286

(22) Filed: Dec. 28, 2012

(65) Prior Publication Data

US 2014/0186164 A1    Jul. 3, 2014

(51) Int. Cl.
*B23H 1/00* (2006.01)
*F01D 5/18* (2006.01)
(Continued)

(52) U.S. Cl.
CPC ............ *B23H 1/00* (2013.01); *B23H 7/265* (2013.01); *B23H 7/30* (2013.01); *B23H 9/10* (2013.01);
(Continued)

(58) Field of Classification Search
CPC .......... F01D 5/186; F01D 9/065; F01D 5/187; F05D 2230/12; F05D 2240/12; F05D 2240/81; B23H 1/00; B23H 7/265; B23H 9/10;B23H 7/30; B23P 15/02; B23P 15/04; Y02T 50/676; Y10T 29/49323; Y10T 29/49341
See application file for complete search history.

(56) References Cited

U.S. PATENT DOCUMENTS 4,818,834 A * 4/1989 Rupert ................ B23H 5/00
                                                                    219/121.71
5,637,239 A    6/1997 Adamski et al.
(Continued)

FOREIGN PATENT DOCUMENTS

EP    1837114     9/2007
GB    2 324 835   11/1998
(Continued)

OTHER PUBLICATIONS

International Preliminary Report on Patentability for PCT Application No. PCT/US2013/073618, mailed Jul. 9, 2015.
(Continued)

*Primary Examiner* — Dwayne J White
*Assistant Examiner* — Adam W Brown
(74) *Attorney, Agent, or Firm* — Carlson, Gaskey & Olds, P.C.

(57) ABSTRACT

A method of machining cooling holes in a component includes the steps of inserting an electro discharge machining guide that houses an electrode into an internal cavity of a component, and machining a cooling hole into a wall of the component with the electrode. A gas turbine engine component includes first and second spaced apart walls providing an internal cavity. The first wall has outer and inner surfaces. The inner surface faces the internal cavity. A cooling hole extends through the first wall from the inner surface to the outer surface. The cooling hole includes entry and exit openings respectively provided in the inner and outer surfaces. The exit opening includes a cross-sectional
(Continued)

area that is smaller than a cross-sectional area of the entry opening.

6 Claims, 3 Drawing Sheets

(51) Int. Cl.
   *B23H 7/26* (2006.01)
   *B23H 7/30* (2006.01)
   *B23H 9/10* (2006.01)

(52) U.S. Cl.
   CPC .......... *F01D 5/187* (2013.01); *F05D 2230/12* (2013.01); *F05D 2240/12* (2013.01); *F05D 2240/81* (2013.01); *Y02T 50/676* (2013.01); *Y10T 29/49323* (2015.01); *Y10T 29/49341* (2015.01)

(56) References Cited

U.S. PATENT DOCUMENTS

| | | | |
|---|---|---|---|
| 6,362,446 B1 | 3/2002 | Jones et al. | |
| 6,644,921 B2 | 11/2003 | Bunker et al. | |
| 6,844,518 B1 * | 1/2005 | Coons | B23H 7/105 219/69.11 |
| 7,008,178 B2 * | 3/2006 | Busch | F01D 5/189 415/115 |
| 7,019,257 B2 | 3/2006 | Stevens | |
| 7,207,108 B2 | 4/2007 | Irmisch et al. | |
| 7,220,934 B2 | 5/2007 | Paauwe et al. | |
| 7,883,320 B2 | 2/2011 | Pietraszkiewicz et al. | |
| 7,997,868 B1 | 8/2011 | Liang | |
| 8,245,519 B1 | 8/2012 | Liang | |
| 2004/0047724 A1 | 3/2004 | Liang | |
| 2005/0286998 A1 | 12/2005 | Lee et al. | |
| 2006/0275553 A1 * | 12/2006 | Subramanian | B23H 1/00 427/421.1 |
| 2009/0169394 A1 | 7/2009 | Crow et al. | |
| 2010/0115967 A1 * | 5/2010 | Maltson | F01D 5/186 60/806 |
| 2011/0243755 A1 | 10/2011 | Naik et al. | |
| 2011/0293423 A1 | 12/2011 | Bunker et al. | |
| 2012/0051941 A1 | 3/2012 | Bunker | |

FOREIGN PATENT DOCUMENTS

| | | |
|---|---|---|
| JP | 2001212723 | 8/2001 |
| KR | 20110045875 | 5/2011 |

OTHER PUBLICATIONS

International Search Report and Written Opinion for International Application No. PCT/US2013/073618 completed on Mar. 25, 2014.
The Extended European Search Report for E Application No. 13866646.6, dated May 23, 2016.

* cited by examiner

NON-LINE OF SIGHT ELECTRO DISCHARGE MACHINED PART

BACKGROUND

This disclosure relates to components for a gas turbine engine, such as airfoils. More particularly, the disclosure relates airfoils that are electro discharge machined.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Turbine vanes used in the turbine section are manufactured as either single vanes, vane doublets, or multiple vanes combining quantities of more than two vanes. Multiple combined vanes such as this may have cooling holes that are not in a location that provides gun barrel line of sight from the machine tool to the hole location. Without line of sight access one way to machine these cooling holes is to use complicated tooling and programming to gain access to the intended location on the external airfoil. The obstructed hole is machined externally.

Turbine airfoil cooling hole position is typically inspected at the external hole breakout to gain some level of confidence that the hole is breaking into the intended internal cavity. However on multiple combined vanes the feature location cannot be inspected since the hole cannot be viewed from the gun barrel axis of the hole. Since the location of the holes cannot be accurately measured from the external surface, there exists some risk that the hole may not be drilled into the intended cavity.

The two manufacturing methods typically utilized for the machining of cooling holes in turbine airfoils are electro discharge machining (EDM) and laser. Many turbine airfoils have a thermal barrier coating applied to the airfoil surfaces and sometimes this is done prior to the installation of cooling holes. The thermal barrier coating is non-conductive so this prevents the use of the EDM process when machining the cooling holes from the external part surface. In these instances the only option is laser hole drilling, which does not have as much dimensional control when compared to EDM and also is not capable of non-line of sight machining.

SUMMARY

In one exemplary embodiment, a method of machining cooling holes in a component includes the steps of inserting an electro discharge machining guide that houses an electrode into an internal cavity of a component, and machining a cooling hole into a wall of the component with the electrode.

In a further embodiment of any of the above, the guide includes first and second portions that are non-colinear with respect to one another.

In a further embodiment of any of the above, the component includes an airfoil. The internal cavity is a cooling passage within the airfoil.

In a further embodiment of any of the above, the component is a turbine stator vane.

In a further embodiment of any of the above, the turbine stator vane is a doublet.

In a further embodiment of any of the above, the method includes the step of applying a thermal barrier coating on the wall on a surface opposite the internal cavity. The applying step is performed before the machining step.

In a further embodiment of any of the above, the wall is obstructed by a structure on a side opposite the internal cavity.

In another exemplary embodiment, a gas turbine engine component includes first and second spaced apart walls providing an internal cavity. The first wall has outer and inner surfaces. The inner surface faces the internal cavity. A cooling hole extends through the first wall from the inner surface to the outer surface. The cooling hole includes entry and exit openings respectively provided in the inner and outer surfaces. The exit opening includes a cross-sectional area that is smaller than a cross-sectional area of the entry opening.

In a further embodiment of any of the above, the component includes an airfoil and the internal cavity is a cooling passage within the airfoil.

In a further embodiment of any of the above, the component is a turbine stator vane.

In a further embodiment of any of the above, the turbine stator vane is a doublet.

In a further embodiment of any of the above, the gas turbine engine component includes a thermal barrier coating provided on the outer surface. The cooling hole extends through the thermal barrier coating. The thermal barrier coating remains intact surrounding the exit opening.

BRIEF DESCRIPTION OF THE DRAWINGS

The disclosure can be further understood by reference to the following detailed description when considered in connection with the accompanying drawings wherein.

DETAILED DESCRIPTION

Figure 1:
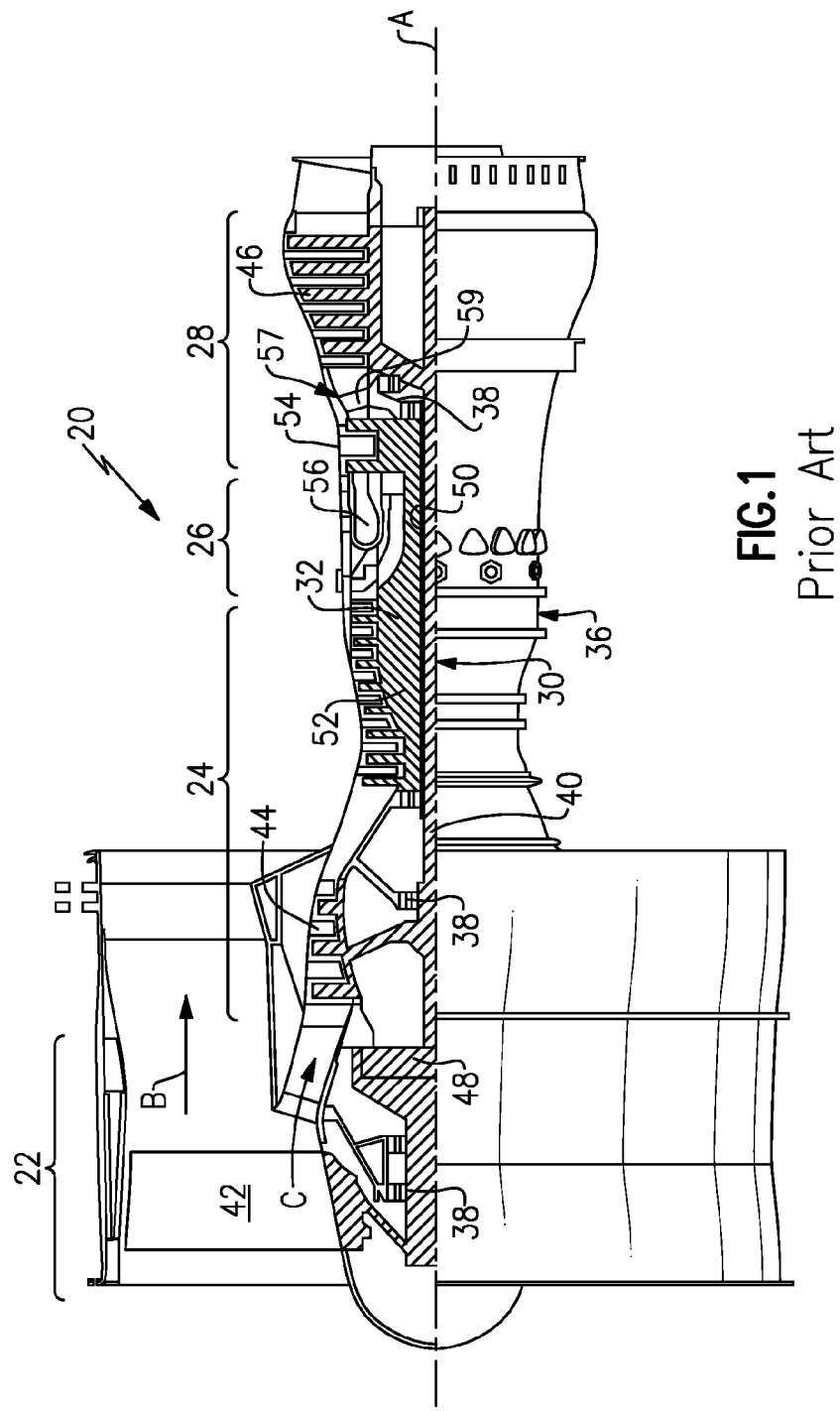
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]0.5$. The "Low corrected fan tip speed", as disclosed herein according to one non-limiting embodiment, is less than about 1150 ft/second.

Figure 2:
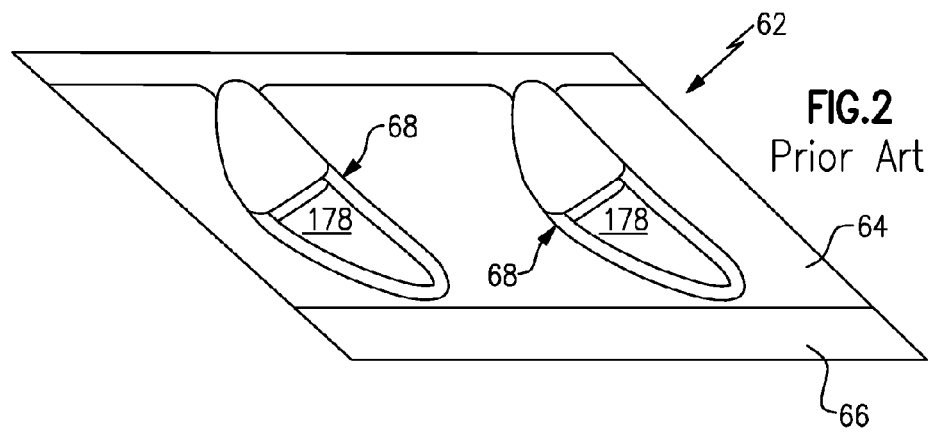
FIG. 2 is a schematic plan view of a stator vane doublet.

FIG. 2 illustrates a stator vane 62, which may be used between stages in the turbine section, such as the high pressure turbine section 54. In the example illustrated, the stator vane 62 is a "doublet" having a pair of airfoils 68 that extend radially between inner and outer platforms 64, 66. Although a stator vane is illustrated as the component in which holes are drilled using an EDM process, other components may benefit from the disclosed system and process.

Figure 3:
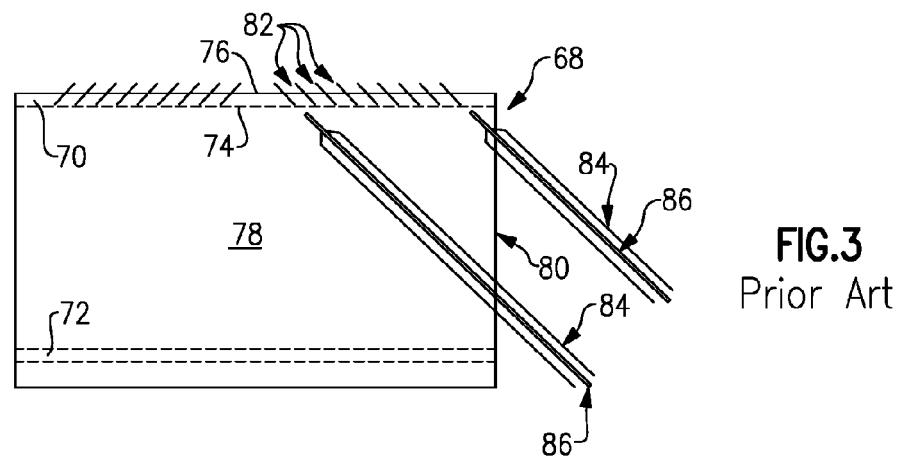
FIG. 3 schematically illustrates walls of adjacent vanes having film cooling holes electrode discharge machined in one of the walls.

In some applications, sufficient room between adjacent airfoils exist to machine film cooling holes 82 using an EDM electrode 86 fed through a straight guide 84, as best shown in FIG. 3. First and second walls 70, 72 are spaced apart from one another. First and second walls 70, 72 may correspond to adjoining walls of a pair of airfoils 68. A space 78 is provided between the first and second walls 70, 72. The first wall 70 has spaced apart first and second surfaces 74, 76. The guide 84 is inserted into the space 78 from an end 80 into the space between the airfoils to a location adjacent to the first surface 74. The electrode 86, which is consumable brass, for example, is fed through the guide 84 as current is provided to the electrode 86, which removes material from the first wall 70 to provide the film cooling hole 82.

Figure 4:
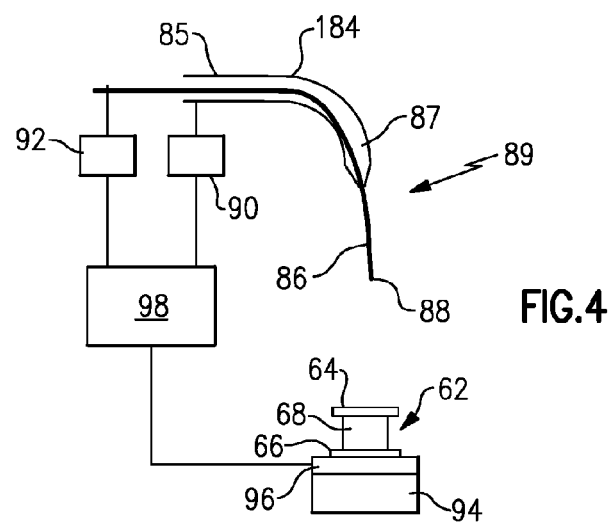
FIG. 4 is a schematic view of an example EDM system configured to machine film cooling holes in a wall with limited access.

A schematic of an example EDM system 89 is illustrated in FIG. 4. The system 89 includes a non-linear guide 184 that may be used to feed a tip 88 of the electrode 86 in areas with much more limited space or conventional guides cannot be used, for example, area obstructed by external structures. In one example, the guide 184 is constructed from stainless steel with a zirconia tip. The guide 184 includes first and second portions 85, 87 that are not co-linear with respect to one another. The first and second portions 85, 87 are canted at an angle relative to one another that enables the guide 184 to be inserted in tight spaces, such as the cooling passage 178 of the airfoil 68 (shown in FIG. 2).

The system 89 includes a guide positioning device 90 that moves the guide 184 in A, B and W directions. The guide may also made movable in additional directions to provide more complicated film hole cooling geometries. The electrode 86 is advanced in a U direction using an electrode feed device 92, which provides current to the electrode 86.

The stator vane 62 is mounted to a table 94 by a fixture 96. The table 94 is movable in X and Y directions. The controller 98 communicates with the guide positioning device 90, electrode feed device 92 and table 94 to position the guide 184 and electrode 86 in desired locations to machine film cooling holes 182, as shown in FIG. 5.

Figure 5:
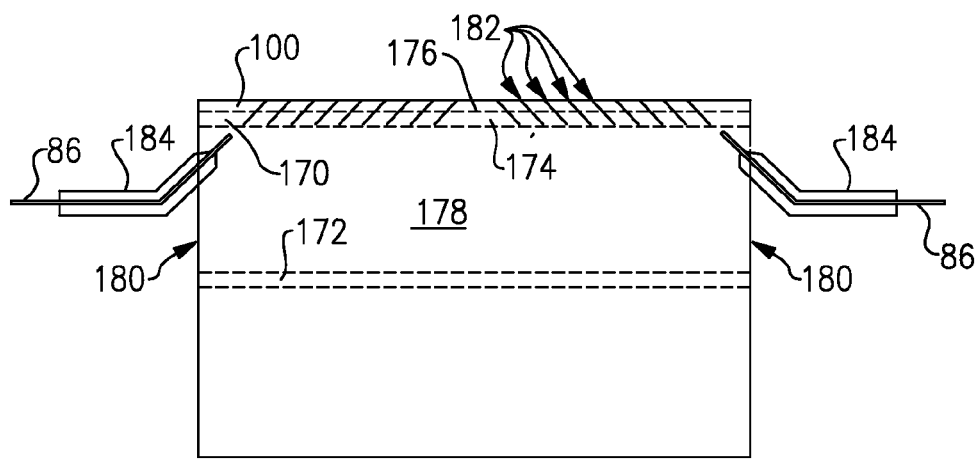
FIG. 5 is a schematic view of film cooling holes machined in a wall from an internal cavity of a component, such as an airfoil.

With continuing reference to FIG. 5, the guide 184 with its electrode 86 is inserted into ends 180 of the cavity 178. In the example, the cavity 178 corresponds to an internal cooling passage of the airfoil 68 between pressure and suction sides of the airfoil 68. The first and second walls 170, 172 are relatively close to one another, such that access to the cavity 178 is limited.

A thermal barrier coating (TBC) 100 is provided on an outer surface 176 of the first wall 170. The electrode 86 is positioned by the guide 184 in a desired position adjacent to the inner wall 174. The current is applied to the electrode 86 and advanced as the electrode 86 is consumed to machine the film cooling holes 182. The TBC 100 is not conductive. However, the electrical and thermal energy that is built up from the initiation of the EDM and through the EDM drilling is sufficient to liberate the TBC in the area around the exit of the film cooling hole 182 at the external breakout location in the outer surface 176. Removing the TBC 100 in this manner will not cause any further damage to the TBC 100 surrounding the film cooling hole 182. That is, the TBC 100 will remain intact surrounding the film cooling hole 182 at the outer surface 176. As a result, the TBC 100 can be applied to the wall 170 prior to machining the film cooling holes 182.

Figure 6:
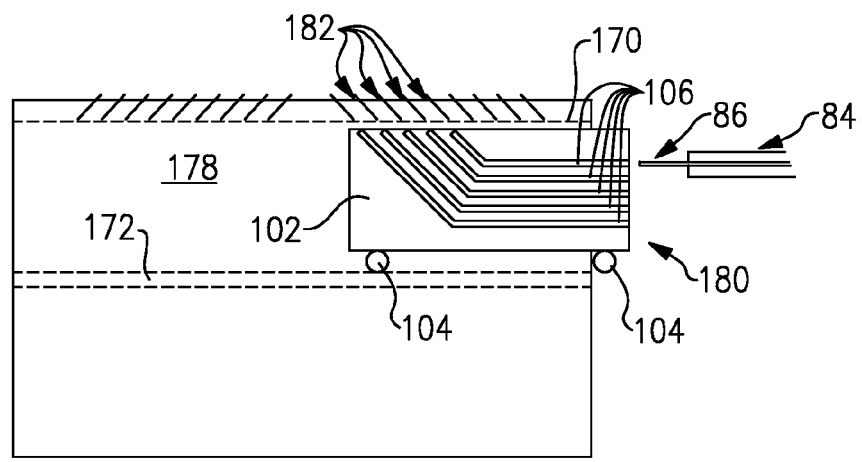
FIG. 6 illustrates a manifold providing passageways used to guide an electrode to a desired location adjacent to a wall.

In another example illustrated in FIG. 6, a manifold 102, which provides the guide, may be placed within the cavity 178. The manifold 102 conforms to the internal cavity shape of the part being machined. The manifold 102 is undersized relative to the size of the cavity 178. The manifold 102 may include one or more locators 104 to facilitate insertion of the manifold 102 into the cavity 178 and locate the manifold 102 in a desired position with respect to the first wall 170.

The manifold 102 includes multiple passages 106, which are non-linear enabling the manifold 102 to guide the electrode 86 to the position desired with respect to the first wall 170. A conventional EDM electrode guide may be used to feed the electrodes through the manifold passages 106 to machine the film cooling holes 182 from the cavity 178.

Figure 7:
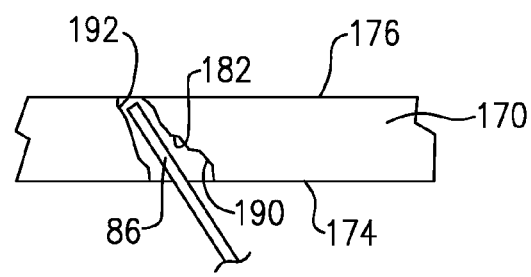
FIG. 7 is an enlarged cross-sectional view of a film cooling hole machined by an electrode.

Referring to FIG. 7, the film cooling hole 182 is shown in more detail. The electrode 86 is provided within the cavity 178. The probe 86 begins forming an entry opening 190 in the inner surface 174 of the wall 170. The electrode 86 continues to remove material from the wall 170 until an exit opening 192 in the outer wall 176 is formed. The exit opening 192 has a smaller cross-sectional area than then the entry opening 190. As a result, the flow of cooling air will be more restricted at the outer surface 176.

Although an example embodiment has been disclosed, a worker of ordinary skill in this art would recognize that certain modifications would come within the scope of the claims. For that reason, the following claims should be studied to determine their true scope and content.

What is claimed is:

1. A method of machining cooling holes in a component comprising the steps of:
    inserting an electro discharge machining guide that houses an electrode into an internal cavity of a component;
    machining a cooling hole into a wall of the component with the electrode; and
    applying a non-conductive thermal barrier coating on the wall on a surface opposite the internal cavity, the applying step performed before the machining step.

2. The method according to claim 1, wherein the guide includes first and second portions that are non-colinear with respect to one another.

3. The method according to claim 1, wherein the component includes an airfoil, and the internal cavity is a cooling passage within the airfoil.

4. The method according to claim 3, wherein the component is a turbine stator vane.

5. The method according to claim 4, wherein the turbine stator vane is a doublet.

6. The method according to claim 1, wherein the wall is obstructed by a structure on a side opposite the internal cavity.

* * * * *